Figure 1:
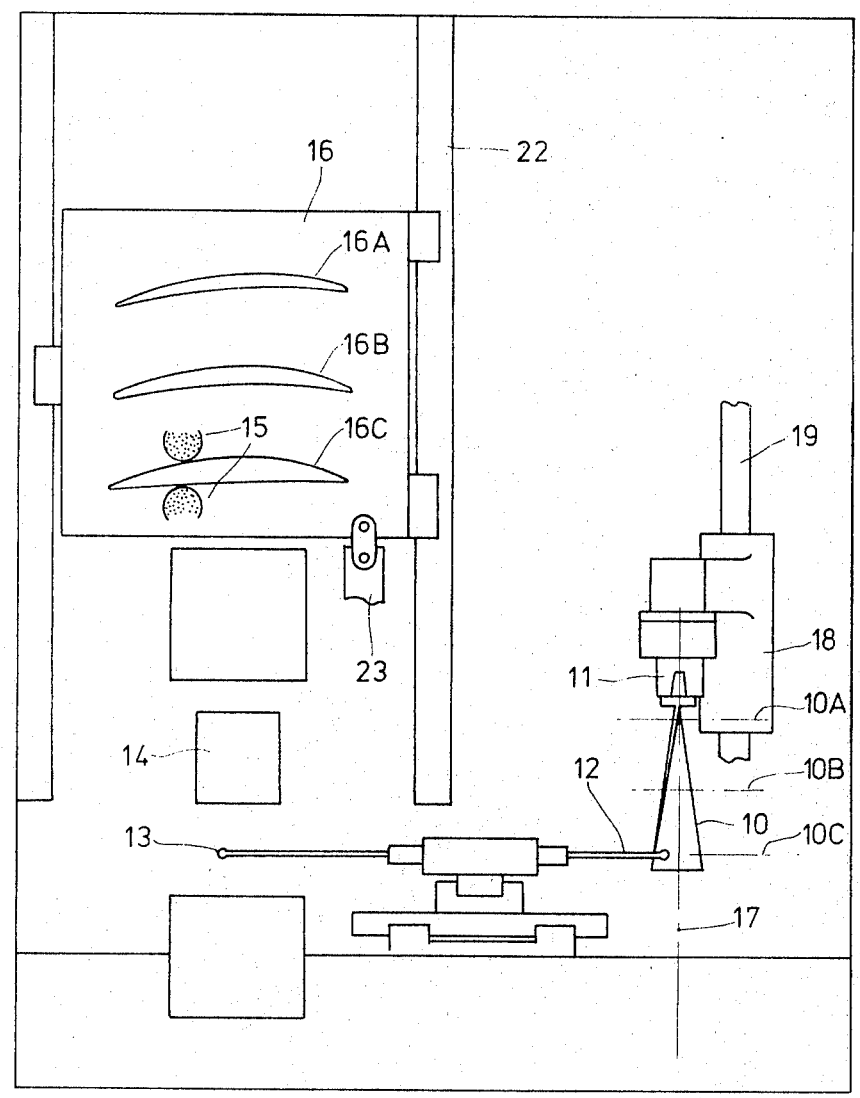

United States Patent [19]
Bartlett

[11] 3,823,483

[45] July 16, 1974

[54] INSPECTION MACHINE

[75] Inventor: Christopher Leslie Bartlett, Bristol, England

[73] Assignee: The Secretary of State for Defence in Her Britannic Majesty's Government of the United Kingdom of Great Britain and Northern Ireland, Whitehall, London, England

[22] Filed: May 15, 1972

[21] Appl. No.: 253,402

[30] Foreign Application Priority Data
May 15, 1971 Great Britain.................. 15186/71

[52] U.S. Cl.............................. 33/174 PA, 353/67
[51] Int. Cl.......................... G01d 5/32, G01b 5/20
[58] Field of Search............. 353/65, 66, 67, 42, 44; 33/174 P

[56] References Cited
UNITED STATES PATENTS
2,580,239  12/1951  March............................. 33/174 P Primary Examiner—Louis R. Prince
Assistant Examiner—A. Jason Mirabito
Attorney, Agent, or Firm—Stevens, Davis, Miller & Mosher

[57] ABSTRACT

The disclosure of this invention pertains to an inspection machine for comparing different profiles of a workpiece with profiles of corresponding masters. A probe is supported for movement relative to the workpiece and an image of a pointer connected to the probe is projected by an enlarging optical system on to a viewing screen on which the master profiles are delineated in spaced apart relationship. The screen is movable relative to the optical system to bring the respective masters into register with the image as required.

5 Claims, 8 Drawing Figures

INSPECTION MACHINE

This invention relates to inspection machines of the kind wherein a tracing stylus is supported for movement relative to a workpiece to sense the profile thereof and wherein an image of a pointer connected to the stylus is projected by an enlarging optical system on to a screen on which a master of the profile is delineated for comparison with the profile of the workpiece.

In cases where two or more different profiles of the work-piece have to be inspected, the corresponding different masters on the screen tend to overlap. The resulting conglomeration of lines is often a source of confusion for the operator of the machine. It is an object of this invention to reduce or overcome this difficulty.

According to this invention there is provided an inspection machine, wherein a probe is supported for movement relative to a work-piece to sense the profile thereof and an image of a pointer connected to the probe is projected by an enlarging optical system on to a viewing screen on which a master of the profile is delineated for comparison with the profile of the work-piece, wherein for the purpose of comparing different profiles of the work-piece there are provided corresponding masters arranged in spaced apart relationship on the screen, the work-piece and probe being relatively movable to bring the probe and the respective profiles of the work-piece into working relationship, and the screen and optical system being relatively movable so as to bring the master of the profile, with which the probe is for the time being in said working relationship, and the image of the pointer into register.

Figure 2:
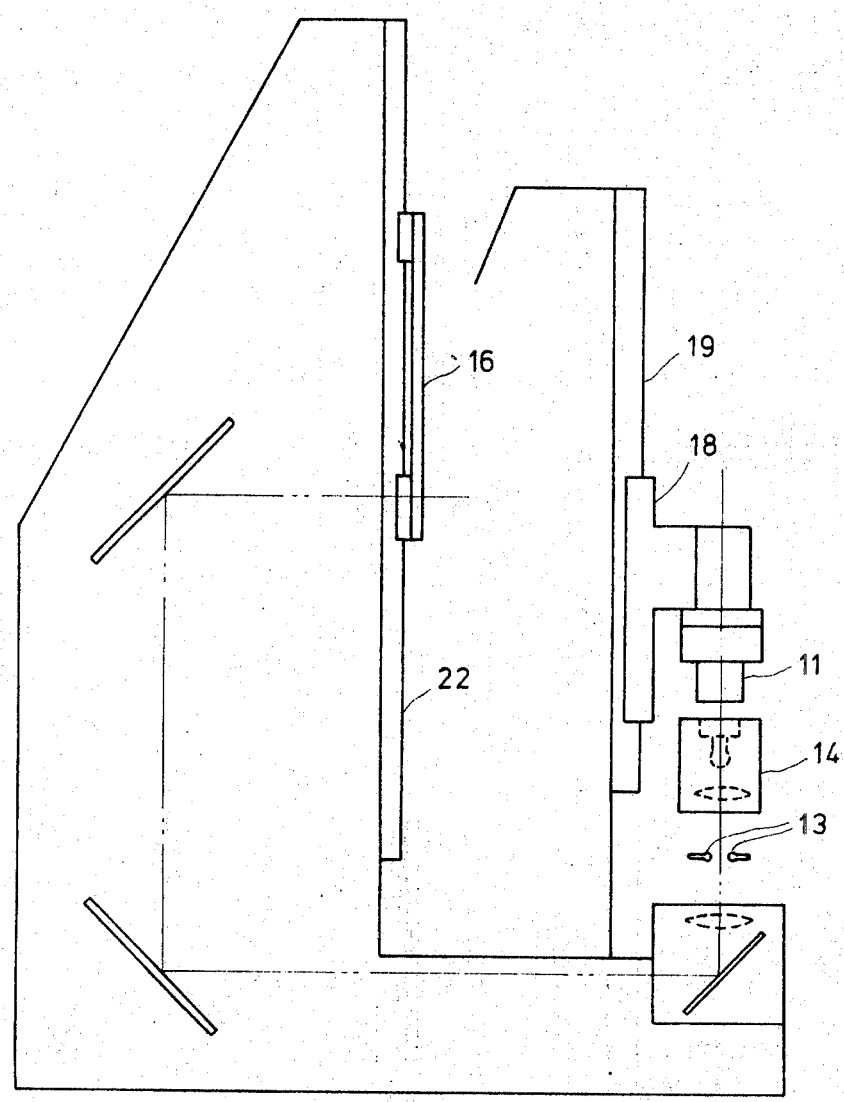
Figure 3:
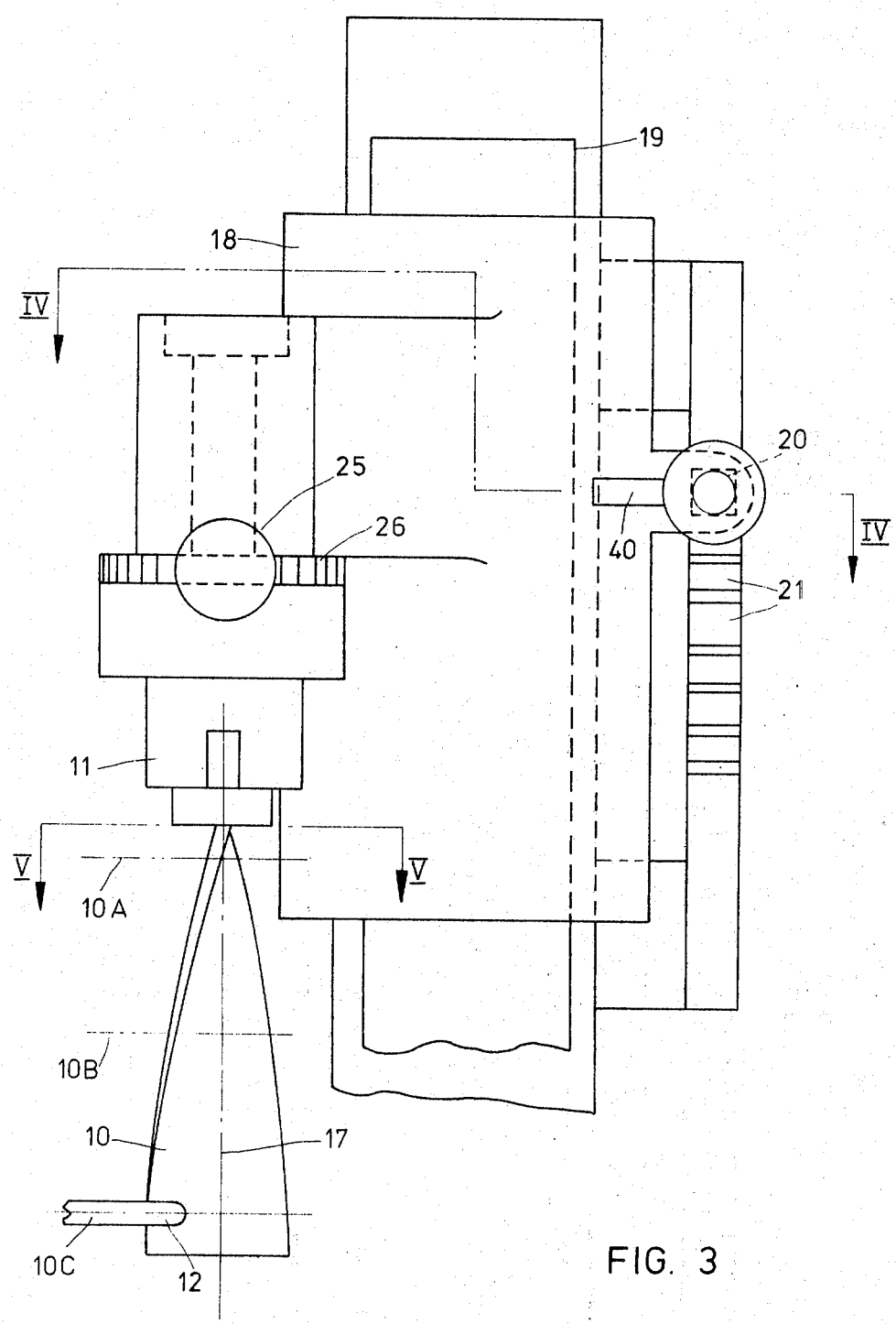
Figure 4:
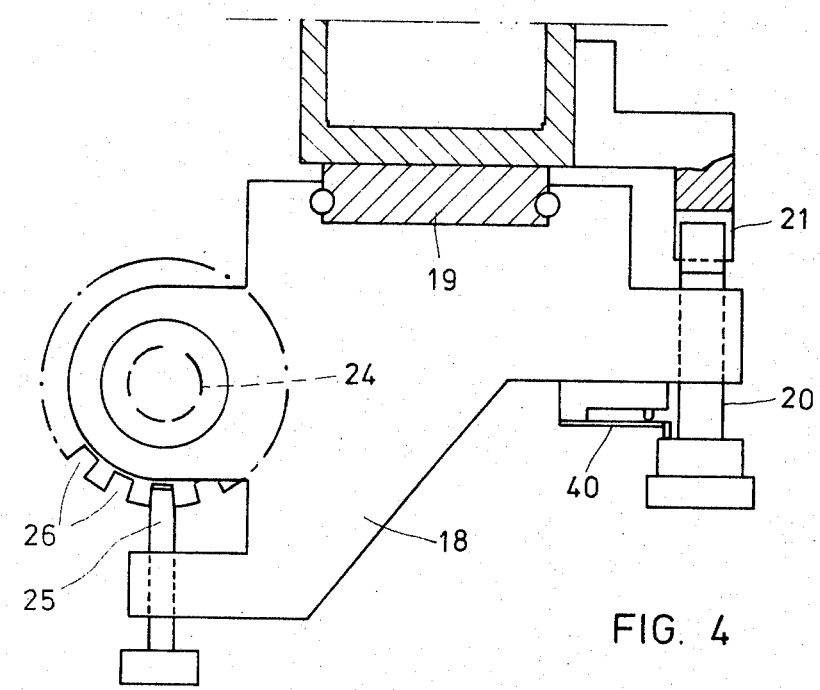
Figure 5:
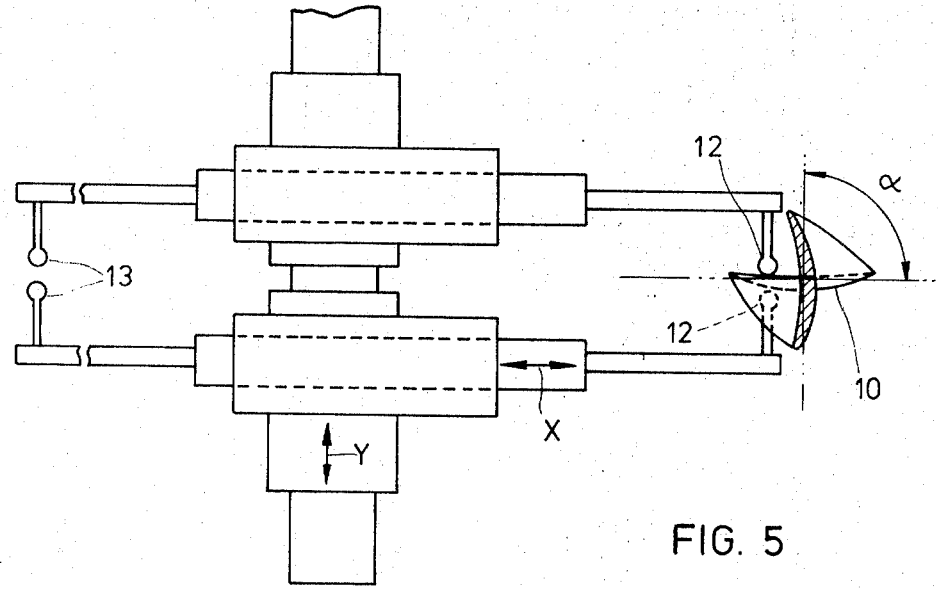
Figures 6, 7:
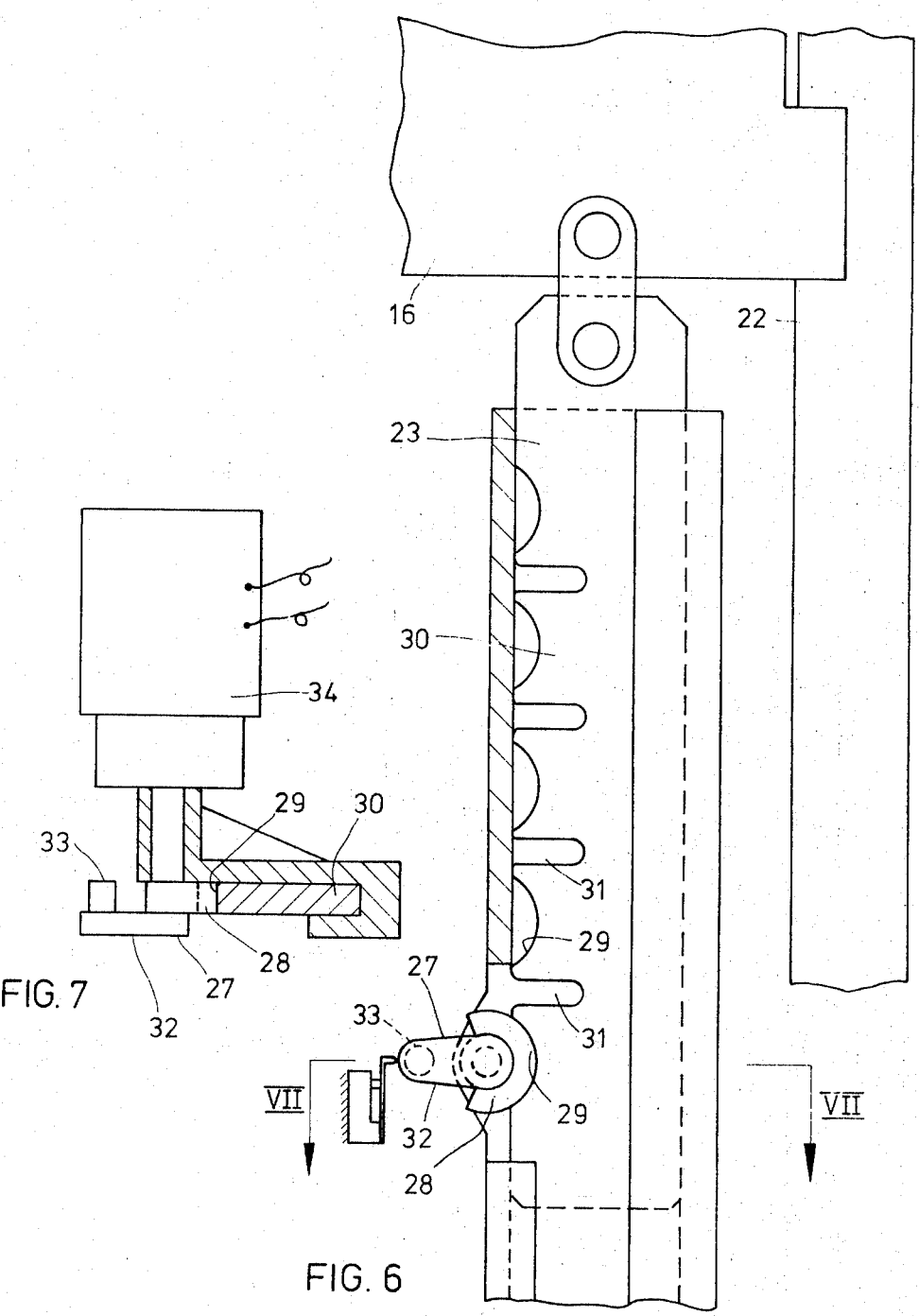
Figure 8:
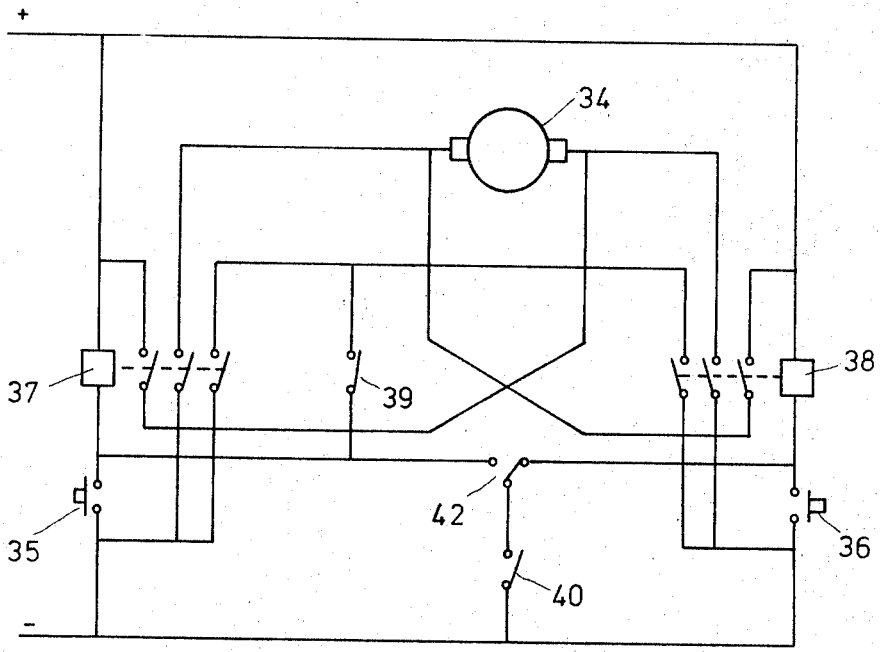

An example of a machine according to this invention will now be described with reference to the accompanying drawings wherein:

FIG. 1 is a diagrammatic front elevation of the machine.
FIG. 2 is a side view of FIG. 1.
FIG. 3 is an enlarged detail of FIG. 1.
FIG. 4 is a section of the line IV—IV in FIG. 3.
FIG. 5 is a section on the line V—V in FIG. 3.
FIG. 6 is another enlarged detail of FIG. 1.
FIG. 7 is a side view of FIG. 6.
FIG. 8 is an electrical circuit diagram.

Referring to the drawings, a work piece 10 being a turbine blade is secured to a holder 11 which is movable relative to a pair of probes or tracing styli 12 connected to pointers 13 arranged in the light path of an enlarging optical system 14 adapted to project an image or shadow 15 of the pointers 13 on to a screen 16.

At different stations along an axis 17 the blade has different cross-sectional profiles 10A, 10B, 10C. Enlarged presentations or masters 16A, 16B, 16C of these profiles are delineated on the screen 16 in positions sufficiently spaced apart to avoid confusion between the lines defining the masters. The screen is movable linearly so that any one of the masters can be brought into register with the shadow 15. The spacing of the masters is in the direction of the movement of the screen and in the same succession as that of the profiles 10A, 10B, 10C, along the axis 17.

The holder 11 is mounted on a carriage 18 supported on a track 19 for movement in the direction of the axis 17. The positioning of the blade along the axis 17 is effected by engagement of a member or plunger 20 in recesses 21 secured to the track. The screen is supported for said linear movement by tracks 22 and its movement is effected by a linear Geneva mechanism 23 whereby the screen is movable by equal amounts. The masters are spaced apart by like amounts.

In view of the twist of the blade aerofoil, as indicated by an angle $\alpha$ in FIG. 5, it is desirable to turn the blade about the axis 17 when there is a change in the position of the blade along the axis 17. To this end the holder 11 is connected to the carriage 18 by a pivot 24 and the angular position of the holder is selectable by engagement of a plunger 25 with equi-spaced notches 26. Each stylus 12 is supported for XY movement and in use the operator selects that angular position of the holder at which the chord line of the blade profile is aligned with the X movement of the stylus as shown in FIG. 5. As a result the masters can be arranged in positions wherein their chord lines are parallel or nearly so. This improves convenience of viewing the masters in operation as well as making it easier for the styli to slide along the profiles.

The Geneva mechanism 23 comprises a rotor 27 having a lobe 28 adapted to engage any one of part-circular recesses 29 in a bar 30 secured to the screen 16 and thereby locate the screen in position. Adjacent each such recess the bar includes a slot 31, and the rotor has an arm 32 including a pin 33 which, during rotation of the rotor, engages a said slot to move the bar until the lobe engages another one of the recesses 29. The rotor 27 is adapted to be driven by an electric actuator or motor 34.

Referring to FIG. 8, the motor 34 is adapted to be energized to raise or lower the screen by push button switches 35,36 respectively. The switches 35,36 are adapted to energize relays 37,38 respectively to connect the motor to a forward or reverse circuit arrangement as shown.

The relays 37,38 each have a contact connected to retain the relay in the energized condition so that the push buttons need only be pressed momentarily. A switch 39 (see also FIGS. 6 and 7) is arranged to be engaged by the arm 32 so that after 360° of rotation of the rotor the supply to the relays 37,38 is cut off and the motor is stopped.

The screen 16 may be moved automatically in response to movement of the carriage 18. To this end a switch 40 is arranged adjacent the plunger 20 (see also FIGS. 3, 4) so that when the plunger moves home in any of the associated notches 21 a circuit is made to both relays 37,38 a manual two-way switch 42 being provided to cut-out whichever relay 37 or 38, is not required to be operated.

What I claim is:

1. An inspection machine, wherein a probe is supported for movement relative to a work-piece to sense the profile thereof and an image of a pointer connected to the probe is projected by an enlarging optical system on to a viewing screen on which a master of the profile is delineated for comparison with the profile of the work-piece, wherein for the purpose of comparing different profiles of the work-piece there are provided corresponding masters arranged in spaced apart relationship on the screen, the work-piece and probe are relatively movable to bring the probe and the respective profiles of the work-piece into working relationship, and means are provided for moving the screen relative to the optical system so as to bring the master of the profile, with which the probe is for the time being in said working relationship, and the image of the pointer into register.

2. An inspection machine according to claim 1 wherein the means for moving the screen relative to the optical system comprises a rotary electric actuator and a connection between the actuator and the screen for converting the rotation of the actuator into stepwise linear motion of the screen.

3. An inspection machine according to claim 2 in which the actuator comprises a geneva mechanism having a bar provided with equispaced alternate recesses and slots, and a rotor having a lobe engageable with a said recess for location of the bar and an arm engageable with a said slot for producing stepwise linear motion of the screen.

4. An inspection machine according to claim 2 in which there exists a connection between the workpiece and the screen the connection comprising switch means responsive to said relative movement of the workpiece to initiate the actuator to effect said motion of the screen.

5. An inspection machine according to claim 4 comprising a member engageable with a recess for locating the work-piece relative to the probe and switch means responsive to such engagement for initiating the actuator to effect said movement of the screen.

* * * * *